(12) United States Patent  
Gierling et al.

(10) Patent No.: US 8,121,762 B2  
(45) Date of Patent: Feb. 21, 2012

(54) METHOD FOR AUTOMATICALLY ENGAGING A PARKING LOCK OF AN AUTOMATIC OR AUTOMATED TRANSMISSION OF A MOTOR VEHICLE

(75) Inventors: Armin Gierling, Langenargen (DE); Walter Hecht, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 894 days.

(21) Appl. No.: 12/170,568

(22) Filed: Jul. 10, 2008

(65) Prior Publication Data

US 2009/0024286 A1 Jan. 22, 2009

(30) Foreign Application Priority Data

Jul. 19, 2007 (DE) .......................... 10 2007 033 582  
Aug. 29, 2007 (DE) .......................... 10 2007 040 547

(51) Int. Cl.  
*G06F 19/00* (2011.01)

(52) U.S. Cl. ........................... 701/51; 192/219.5; 477/94

(58) Field of Classification Search .................... 701/51; 192/219.5; 477/94  
See application file for complete search history.

(56) References Cited

U.S. PATENT DOCUMENTS

| | | | |
|---|---|---|---|
| 3,937,105 A | | 2/1976 | Arai et al. |
| 4,722,427 A * | | 2/1988 | Prumbaum et al. ......... 192/219.5 |
| 4,892,014 A * | | 1/1990 | Morell et al. .................... 477/92 |
| 5,696,679 A | | 12/1997 | Marshall et al. |
| 5,919,112 A * | | 7/1999 | Michael et al. .................. 477/99 |
| 6,354,422 B1 * | | 3/2002 | Kim ............................ 192/219.5 |
| 6,374,978 B1 * | | 4/2002 | Spencer ...................... 192/220.3 |
| 6,401,899 B1 * | | 6/2002 | Kanehisa et al. ........... 192/219.5 |
| 6,589,131 B2 * | | 7/2003 | Miyata et al. .................... 477/34 |
| 6,679,810 B1 * | | 1/2004 | Boll et al. ...................... 477/195 |
| 7,216,941 B2 * | | 5/2007 | Thomas .......................... 303/89 |
| 7,303,057 B2 * | | 12/2007 | Yamamoto ................. 192/219.4 |
| 7,416,514 B2 * | | 8/2008 | Dell et al. ....................... 477/80 |
| 7,484,613 B2 * | | 2/2009 | Kim et al. .................... 192/219.5 |
| 7,694,795 B2 * | | 4/2010 | Berger et al. ............... 192/219.5 |
| 7,958,985 B2 * | | 6/2011 | Haupt et al. ................ 192/219.5 |
| 2006/0232125 A1 * | | 10/2006 | Thomas ............................ 303/7 |
| 2007/0125619 A1 * | | 6/2007 | Berger et al. ............... 192/219.5 |
| 2009/0024286 A1 * | | 1/2009 | Gierling et al. .................. 701/51 |

FOREIGN PATENT DOCUMENTS

| | | |
|---|---|---|
| DE | 41 27 991 A1 | 2/1993 |
| EP | 0 814 287 A2 | 12/1997 |
| WO | WO 03 056 213 A1 | 7/2003 |

* cited by examiner

*Primary Examiner* — Thomas G. Black  
*Assistant Examiner* — Wae Louie  
(74) *Attorney, Agent, or Firm* — Davis & Bujold, P.L.L.C.

(57) ABSTRACT

A method of automatically engaging a parking lock of an automatic or automated transmission of a motor vehicle, which can be engaged by way of a selector device depending on a drive position selected by the driver of the motor vehicle and depending on other operating parameters. In order to achieve as little restriction of the drivability of the motor vehicle as possible, without neglecting the safety of the driver and the surroundings, five different variation of an Auto-P function are proposed for automatically engaging the parking lock: two of these variations are associated with an electrically interrupted ignition circuit of the motor vehicle; two variations are associated with an electrically closed ignition circuit and a simultaneously stopped vehicle drive motor and one variations is associated with an electrically closed ignition circuit and a simultaneously operating drive motor.

16 Claims, 7 Drawing Sheets

METHOD FOR AUTOMATICALLY ENGAGING A PARKING LOCK OF AN AUTOMATIC OR AUTOMATED TRANSMISSION OF A MOTOR VEHICLE

This application claims priority from German Application Serial No. 10 2007 033 582.4 filed Jul. 19, 2007 and German Application Serial No. 10 2007 040 547.4 filed Aug. 29, 2007.

FIELD OF THE INVENTION

The invention relates to a method for automatically engaging a parking lock of an automatic or automated transmission of a motor vehicle, which can be engaged depending on a drive position selected by the driver using a selector device and depending on other operating parameters of the motor vehicle.

BACKGROUND OF THE INVENTION

Known automatic or automated motor vehicle transmissions normally feature a parking lock, by way of which an output shaft of the transmission can be mechanically fixed. In addition to a purely mechanical system for actuating this kind of parking lock such that a mechanical functional connection between a selector lever operable by the driver in the interior of the motor vehicle and the parking lock in the transmission, there are also known electromechanical and electrohydraulic systems for actuating this type of parking lock—for example from DE 41 27 991 C2—in which the parking lock in the transmission is connected via an electric functional connection with a selector device operable by the driver in the interior of the motor vehicle, and in which the parking lock can be electromechanically or electrohydraulically actuated by way of a parking-brake function implemented in an electronic control device of the transmission, depending on a drive position selected on the selector device and depending on other operating parameters of the motor vehicle.

In addition, there are various known methods of automatically engaging this kind of parking lock. U.S. Pat. No. 3,937,105 proposes automatically engaging the parking lock of the transmission independently of the driving position selected by the driver if an ignition circuit of the motor vehicle is interrupted and the motor vehicle is still coasting at a speed that is lower than a defined low threshold value.

A method is known from U.S. Pat. No. 4,892,014 in which the parking lock of the transmission is engaged, on the one hand automatically by way of an electric motor when an ignition circuit of the motor vehicle is interrupted and at the same time the vehicle speed is lower than a defined low threshold value, and on the other hand, when the driver's door of the motor vehicle is open and at the same time the driver's seat of the motor vehicle is unloaded, and at the same time the vehicle speed is lower than the cited low threshold value. In both cases, it is provided that when the parking lock is automatically engaged, a parking brake of the motor vehicle is actuated as well. In U.S. Pat. No. 4,892,014, it is also proposed that when the ignition circuit is closed when the drive motor of the motor vehicle is not running, the transmission automatically switches to its neutral position, without a driver request being necessary.

And finally, from EP 0 814 287 B1, a function for automatically engaging the parking lock of an automatic transmission is known, with which the parking lock in the automatic transmission is automatically engaged by the transmission control device when the speed of the motor vehicle is zero and at the same time an ignition circuit is interrupted, and at the same time, as an additional condition, either a predetermined time interval has passed since the interruption of the ignition circuit or a vehicle door is opened, but no later than—and then as the only condition—when the ignition key has been removed from the ignition switch. In order to achieve better vehicle availability, it is a special feature in all three cases that the engagement of the parking lock is prevented when the driver, immediately before switching off the motor or within a predetermined time interval after switching off the motor, has selected the neutral drive position with the selector lever.

The object of the invention is to devise a function for automatically engaging the parking lock of an automatic or automated transmission that is an alternative to the state of the art, which on the one hand sufficiently protects the vehicle against start-up or rolling not intended by the driver, and on the other hand, has the least possible impairment of vehicle drivability, while avoiding, as far as possible, a change in the operating state of the transmission or the vehicle that is surprising to the driver.

SUMMARY OF THE INVENTION

The proposed five different variations of an auto P-function for the automatic engagement of a parking lock of an automatic or automated transmission of a motor vehicle include two variations in connection with the electrically interrupted ignition circuit of the motor vehicle, two variations in connection with the electrically closed ignition circuit and simultaneously non-operating drive motor of the motor vehicle, and one variation in connection with an electrically closed ignition circuit and simultaneously running drive motor.

All five proposed approaches of the invention are based on a method according to which the parking lock of the automatic or automated motor vehicle transmission can be automatically engaged depending on a drive position selected by the vehicle driver by way of a selector device, and depending on other driving parameters of the motor vehicle.

Essential to the invention in all five proposed approaches is the respective functional connection of the respective individual aspects or individual criteria. In order to provide a clear presentation of these functional connections that avoids confusion, the known Boolean logical operators will be used.

BRIEF DESCRIPTION OF THE DRAWINGS

The invention will now be described, by way of example, with reference to the accompanying drawings in which.

DETAILED DESCRIPTION OF THE INVENTION

Figure 1:
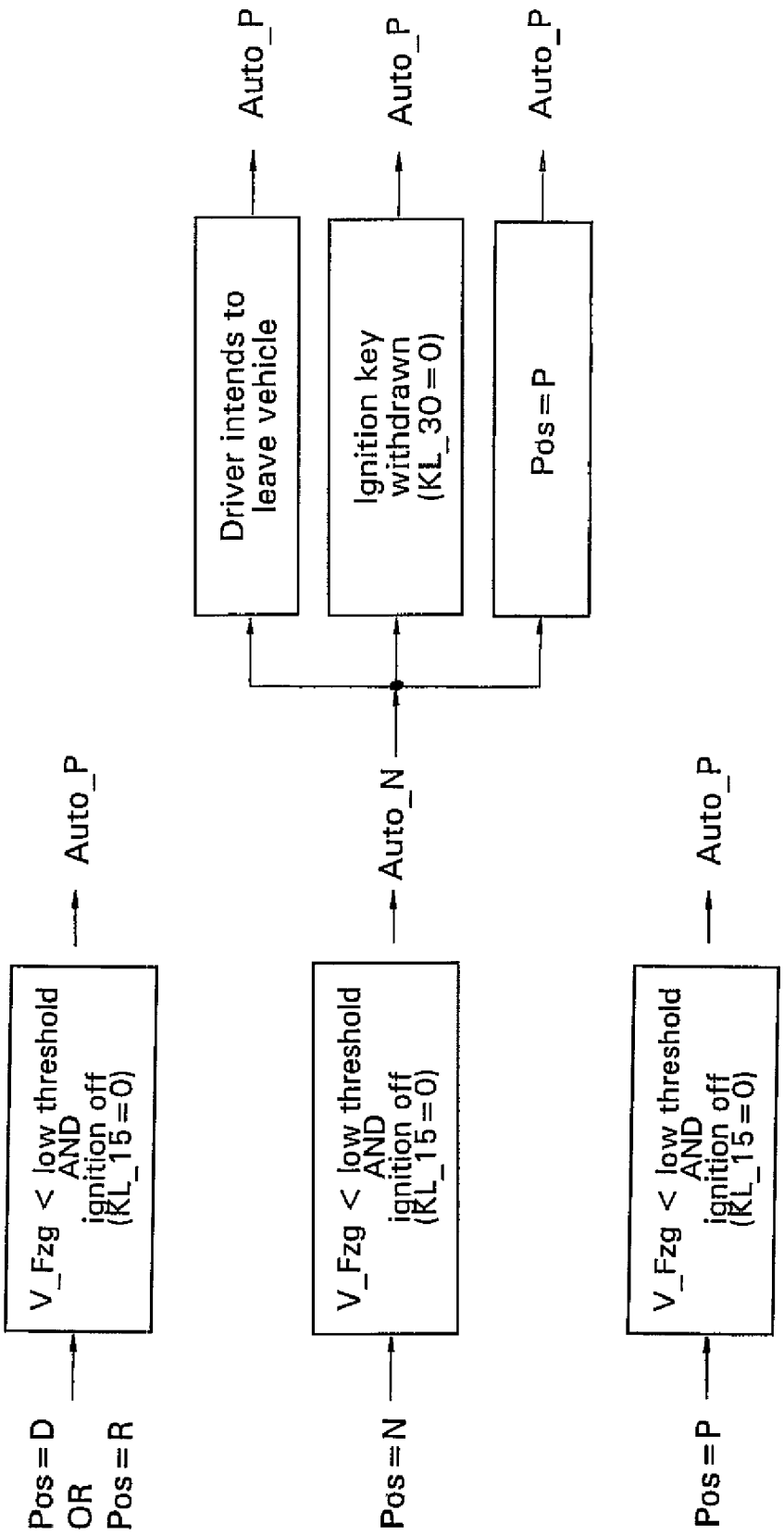
FIG. 1 is an operation sequence diagram of a first embodiment of a method of automatically engaging a parking lock of an automatic or automated transmission of a motor vehicle.

In a first approach to the object, it is provided that IF a detected current speed (v_Fzg) of the motor vehicle is lower than a predefined low threshold value, AND at the same time an ignition circuit (KL_15) acting on a drive motor of the motor vehicle is electrically interrupted, AND at the same time a drive position "Neutral" (N) is selected by way of the selector device, in the transmission the drive position "Neutral" (N) remains engaged or is automatically engaged, AND that IF the current speed of the motor vehicle is lower than the predefined low threshold value, AND at the same time the ignition circuit is electrically interrupted, AND at the same time a drive position "Drive" (D) or "Reverse" (R) is selected, the parking lock of the transmission is automatically engaged, AND that IF the current speed of the motor vehicle is lower than the predefined low threshold value, AND at the same time the ignition circuit is electrically interrupted, AND at the same time a drive position "Park" (P) is selected by way of the selector device, the parking lock of the transmission is engaged or remains engaged, AND that IF the current speed of the motor vehicle is lower than the predefined low threshold value, AND at the same time an ignition key in a mechanical or electromechanical ignition switch is unlocked or removed from the mechanical or electromechanical ignition switch (KL_30), or is located outside a defined zone around an electronic ignition switch of the motor vehicle, the parking lock of the transmission is engaged.

According to the invention, therefore, the three individual functions, each with its own functional logic, are here combined using Boolean AND operators into a complex overall function.

The first individual function ("IF a detected current speed of the motor vehicle is smaller than a predefined low threshold value AND at the same time an ignition circuit acting on a drive motor of the motor vehicle is electrically interrupted, AND at the same time a drive position "Neutral" is selected using the selector device, THEN—if this has not already happened—the drive position "Neutral" will be automatically engaged in the transmission) takes into account the operating states in which the driver himself, before or during realization that the motor vehicle with an interrupted ignition circuit is stopped or has at least almost come to a stop, selects the neutral position using the selector device of the motor vehicle. In order to realize the greatest possible drivability of the motor vehicle—for example in order to use a vehicle washing facility—automatic engagement of the parking lock of the transmission is dispensed with. There is sufficiently high safety for the vehicle occupants and the environment, because the driver himself has deliberately put the transmission into the neutral position and therefore ensured that the drivetrain of the motor vehicle is not engaged. The driver himself can at any time actively engage the parking lock by switching the selector device from "Neutral" to "Park." By way of an ignition-switch lock—also known as a "key lock"—which is optionally activated in parallel with the selected drive position N or, in general, in parallel with a selected drive position "NON P"—it can be ensured that the mechanical ignition key cannot be unintentionally withdrawn from its mechanical or electromechanical ignition switch, or that, with a keyless ignition switch system, an electronic ignition key—also known as a "ID card"—cannot be unintentionally taken too far from its electronic ignition switch. In active state, known mechanical ignition-switch locks, for example by way of an electromagnetically activated locking element, prevent the ignition key from being removed from the ignition switch if the selector device of the motor vehicle is not in the drive position "Park" (P).

The second individual function ("IF the current speed of the motor vehicle is lower than the predefined low threshold value AND at the same time the ignition circuit is electrically interrupted, AND at the same time a drive position "Drive" or "Reverse" has been selected, THEN the parking lock of the transmission is automatically engaged") takes into account the driving states in which the selector device, before or during realization that the motor vehicle with an interrupted ignition circuit is stopped or has almost come to a stop, is in a position which results in power being transmitted to the transmission due to the drive motor running, or because there is a sufficient supply of pressure medium to the transmission. In this case, for safety reasons, the parking lock of the transmission is automatically engaged in order to prevent, in any event, the motor vehicle from rolling.

The third individual function ("IF the current speed of the motor vehicle is lower than the predefined low threshold value AND at the same time the ignition circuit is electrically interrupted AND at the same time the drive position "Park" is selected using the selector device, THEN—if it has not already taken place—the parking lock of the transmission is engaged") takes into account the operating states in which the driver, before or during realization that the motor vehicle with an interrupted ignition circuit is stopped or has almost come to a stop, has himself selected the park position using the selector device of the motor vehicle. This unequivocal wish on the part of the driver is implemented in the transmission by way of the third individual function.

The fourth individual function ("IF the current speed of the motor vehicle is lower than the predefined low threshold value, AND at the same time an ignition key in a mechanical or electromechanical ignition switch is unlocked or has been removed from the mechanical or electromechanical ignition switch or is outside a defined zone around an electronic ignition switch of the motor vehicle, THEN—if it has not already taken place—the parking lock of the transmission is engaged") takes into account the driver's request, articulated by unlocking the ignition switch or removing the ignition key, to lock the drivetrain of the motor vehicle, and accordingly switches the transmission to the parking position with blocked output.

As a result, through the combination of these four individual functions by way of logical AND, a high vehicle availability is achieved and at the same time a high degree of safety for the vehicle occupants and surroundings against undesired rolling of the motor vehicle.

Figure 1A:
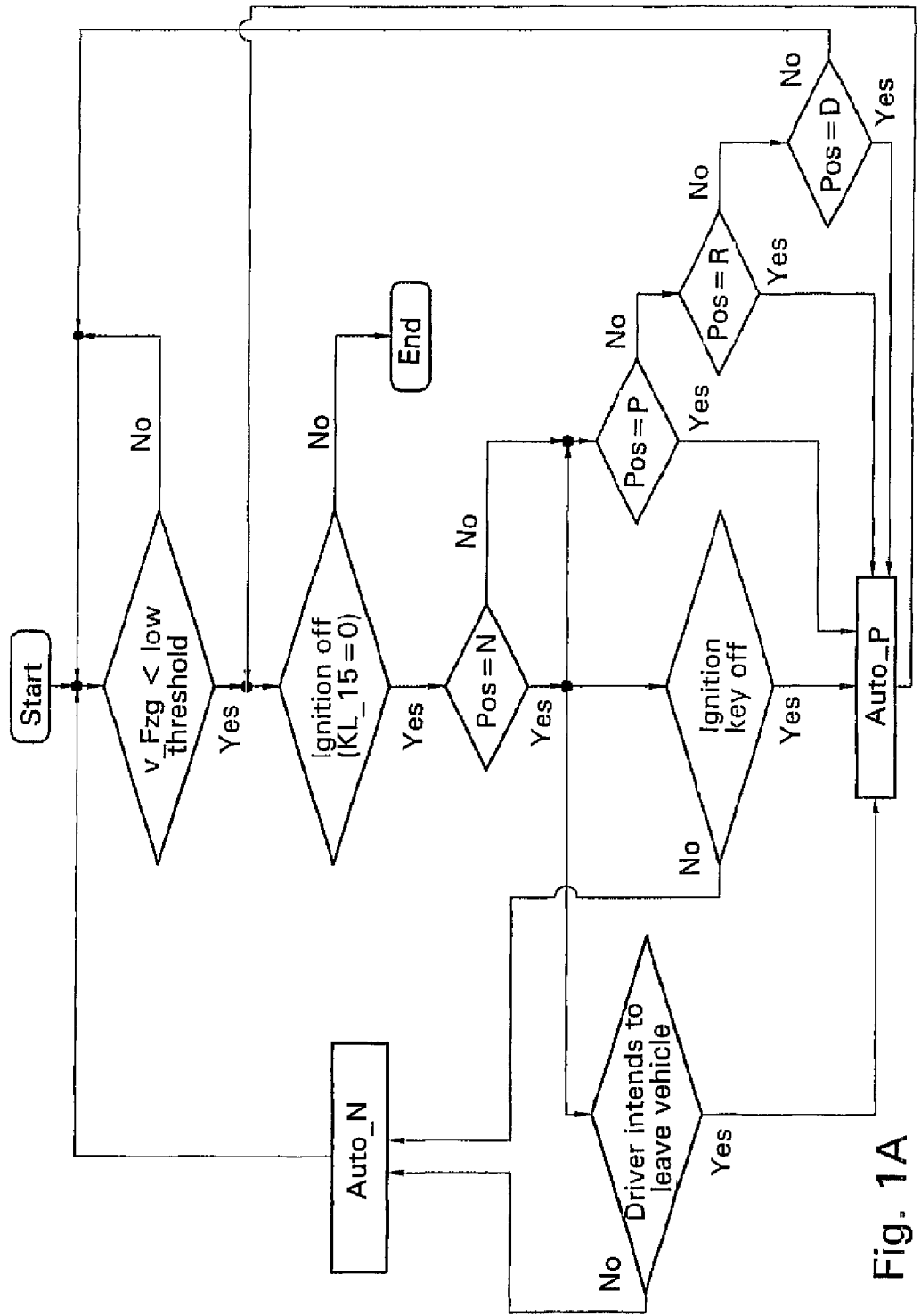
FIG. 1A is a variation of the operation sequence diagram of the first embodiment of the method of disclosed in FIG. 1.
Figure 1B:
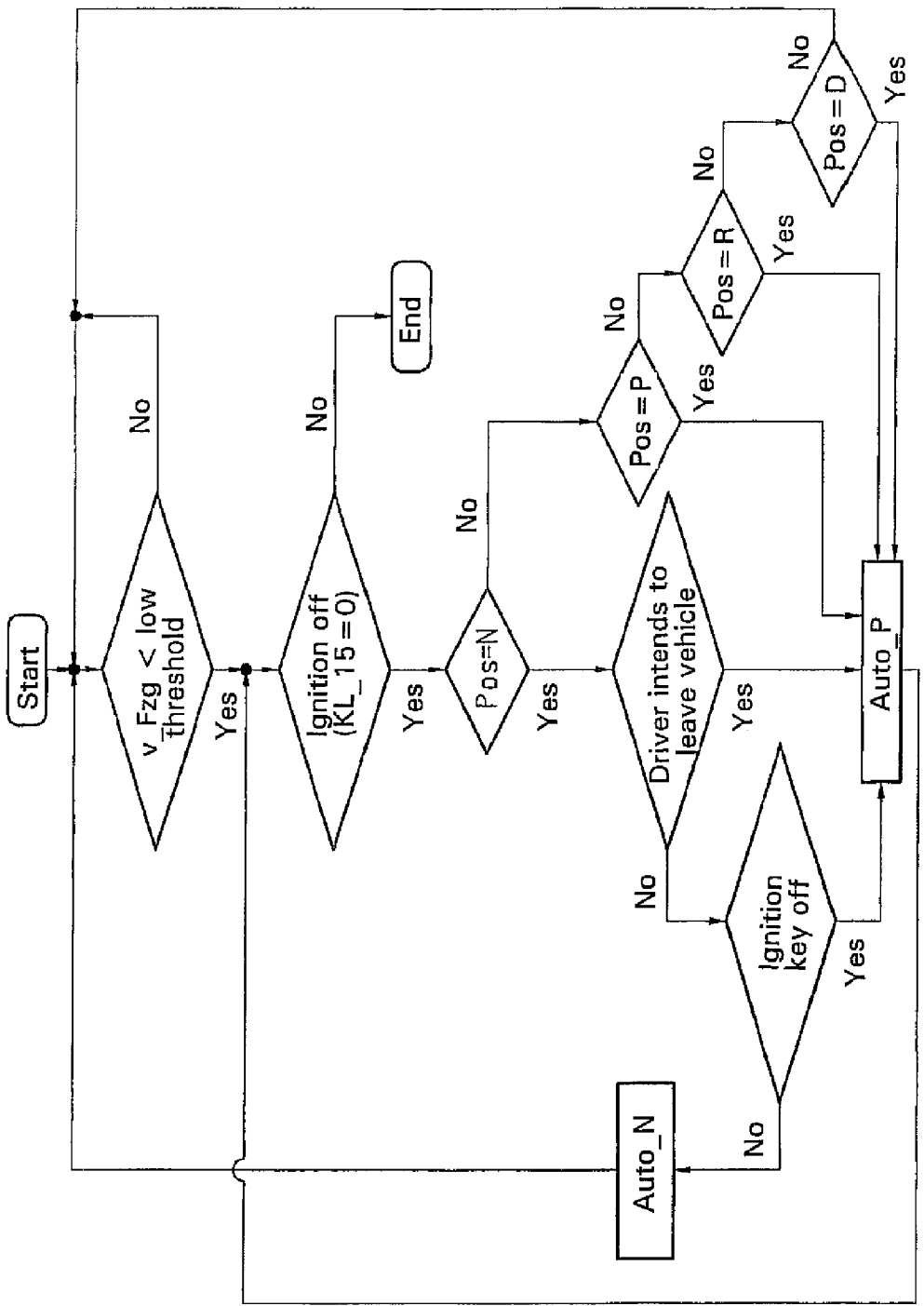
FIG. 1B is another variation of the operation sequence diagram of the first embodiment of the method of disclosed in FIG. 1.

For further explanation, operation sequence diagrams are shown in FIGS. 1, 1A, and 1B, as examples of technical implementation of a method according to the above-detailed first approach according to the invention. As their graphic representation is clearly understandable as such to the person skilled in the art, comprehensive explanation of the figures can be dispensed with at this point in order to avoid repetition. The reference symbols used and their meaning are listed in the list of reference symbols.

In a second approach to the object, it is provided in accordance with the invention that IF the detected current speed of the motor vehicle is lower than a predefined low threshold value, AND at the same time an ignition circuit acting on the drive motor of the motor vehicle is electrically interrupted, AND at the same time the drive position "Neutral" (N) is selected by way of the selector device, AND it is simultaneously detected that the driver does not intend to leave the vehicle, the drive position "Neutral" (N) remains engaged in the transmission or is engaged, AND that IF the current speed of the vehicle is lower than the predefined low threshold value AND at the same time the ignition circuit is electrically interrupted, AND at the same time the drive position "Neutral" (N) is selected by way of the selector device, AND it is detected at the same time that the driver intends to leave the vehicle or is leaving it, the drive position "Neutral" (N) remains engaged in the transmission or is engaged, AND a warning is automatically issued to the driver, AND that IF the current speed of the motor vehicle is lower than the predefined low threshold value, AND at the same time the ignition circuit is electrically interrupted, AND at the same time, using the selector device, a drive position "Drive" (D) or "Reverse" (R) is selected, AND at the same time, it is detected that the driver does not intend to leave the motor vehicle, the drive position "Neutral" (N) is automatically engaged, AND that IF the current speed of the motor vehicle is lower than the predefined low threshold value, AND at the same time the ignition circuit is electronically interrupted, AND at the same time, using the selector device, a drive position "Drive" (D) or "Reverse" (R) is selected, AND it is detected at the same time that the driver of the motor vehicle intends to leave the vehicle or is leaving it, the parking lock of the transmission is automatically engaged, AND that IF the current speed of the motor vehicle is lower than the predefined low threshold device, AND at the same time the ignition circuit of the motor vehicle is electrically interrupted, AND at the same time, the drive position "Park" (P) is selected using the selector device, the parking lock of the transmission is engaged or remains engaged, AND that IF the current speed of the motor vehicle is lower than the predefined low threshold value, AND at the same time, an ignition key in a mechanical or electromechanical ignition switch is unlocked or removed from the mechanical or electromechanical ignition switch or is outside a defined zone around an electronic ignition switch of the motor vehicle, the parking lock of the transmission is automatically engaged.

Six individual functions, each with its own functional logic, are therefore combined by way of Boolean AND-operators into a complex overall function in accordance with the invention.

The first individual function ("IF a detected current speed of the motor vehicle is lower than a predefined low threshold value AND at the same time, an ignition circuit acting on the drive motor of the motor vehicle is electrically interrupted, AND at the same time a drive position "Neutral" is selected using the selector device, AND at the same time it is realized that the driver does not intend to leave the vehicle, THEN—if this has not already happened—the drive position "Neutral" is engaged") takes into account the operating states in which the driver before or during detection that the motor vehicle, with the ignition circuit interrupted, is stopped or has at least almost come to a stop, himself selects the neutral position using the selector device of the motor vehicle. In order to realize the highest possible drivability of the motor vehicle—for example, in order to use a car washing facility—automatic engagement of the parking lock is dispensed with. There is a high degree of safety for the vehicle occupants and the surroundings because the driver has himself deliberately selected the neutral position of the transmission, and thus non-engagement of the drivetrain of the motor vehicle, and because there is also monitoring of whether the vehicle driver intends to leave the motor vehicle or is currently leaving it. The driver can himself actively engage the parking lock of the transmission at any time by switching the selector device from "Neutral" to "Park." By way of a optional ignition-switch block that is additionally actuated in parallel with the selected drive position N, or generally in parallel with a selected drive position "NON P"—also known as a "key lock"—it can be ensured that the mechanical ignition key is not unintentionally removed from its (mechanical, or electromechanical) ignition switch, or, in the case of a keyless ignition-switch system, an electronic ignition key—also known as a "ID card"—is not unintentionally taken too far away from its (electronic) ignition switch. With known mechanical ignition-switch blocks, in activated state, an electromagnetically activated locking element, for example, prevents the ignition key from being removed from the ignition switch when the selector device of the motor vehicle is not in the drive position "Park" (P).

If, however, it is detected that the driver intends to leave the vehicle while the motor vehicle, with an interrupted ignition circuit, is at least nearly at a standstill, and the transmission, per the driver's wishes, is in a neutral position, the second individual function ("IF the current speed of the motor vehicle is lower than the predefined threshold value, AND at the same time the ignition circuit is electrically interrupted, AND at the same time the drive position "Neutral" is selected using the selector device, and it is detected that the driver intends to leave the vehicle or is in the process of leaving it, THEN—if it has not already happened—the drive position "Neutral" is engaged in the transmission") becomes active: the transmission remains in the neutral position requested by the driver, but now in addition a relevant warning is given automatically to the driver, which alerts the driver to the possibility of the vehicle rolling. In order to prevent unwanted rolling of the vehicle, the driver himself can at any time actively engage the parking lock of the transmission by switching the selector device from "Neutral" to "Park."

The third individual function ("IF the current speed of the motor vehicle is lower than the predefined low threshold value, AND at the same time the ignition circuit is electrically interrupted, AND at the same time the drive position "Drive" or "Reverse" is selected using the selector device, AND it is detected at the same time that the driver does not intend to leave the vehicle, THEN the drive position "Neutral" is automatically engaged in the transmission") takes into account the operating states in which the selector device, before or during detection that the motor vehicle, with an interrupted ignition circuit, is stopped or has almost come to a stop, is in a position which results in power being transmitted to the transmission due to the drive motor running, or because there is a sufficient supply of pressure medium to the transmission. The (additional) monitoring in the third individual function, to determine whether the driver intends to leave the vehicle or is in the process of leaving it, allows another increase in vehicle availability: if it is reliably detected that the driver does not intend to leave the vehicle, automatic engagement of the parking lock is dispensed with and the transmission is put into its non-engaged neutral position. As in the case of the first and second individual functions, optionally an additional actuation of the ignition-block can be provided for, in order to protect against unintentional withdrawal or removal of the ignition key from the ignition switch.

The fourth individual function ("IF the current speed of the motor vehicle is lower than the predefined low threshold value, AND at the same time the ignition circuit is electrically interrupted, AND at the same time a drive position "Drive" or "Reverse" has been selected using the selector device, AND it is detected at the same time that the driver intends to leave the motor vehicle or is in the process of doing so, THEN the parking lock of the transmission is automatically engaged") like the third individual function takes into account the operating states in which the selector device, before or during detection that the motor vehicle, with an interrupted ignition circuit, is stopped or nearly stopped, is in a position which results in power being transmitted to the transmission due to the drive motor running, or because there is a sufficient supply of pressure medium to the transmission. If, in contrast to the third individual function, it is also detected that the driver intends to leave the vehicle or is in the process of doing so, the parking lock of the transmission is automatically engaged for safety reasons, in order to prevent the motor vehicle from rolling, in any case, if the driver is no longer in the motor vehicle.

The fifth individual function ("IF the current speed of the motor vehicle is lower than the predefined low threshold value, AND at the same time the ignition circuit of the motor vehicle is electrically interrupted, AND at the same time a drive position "Park" has been selected using the selector device, THEN—if this has not already happened—the parking lock of the transmission is engaged") takes into account the operating states in which the driver, before or during detection that the motor vehicle, with an interrupted ignition circuit, is stopped or has almost come to a stop, has himself selected the park position using the selector device. This unequivocal wish of the driver is implemented in the transmission by way of this fifth individual function.

The sixth individual function ("IF the current speed of the motor vehicle is lower than the predefined low threshold value, AND at the same time an ignition key in a mechanical or electromechanical ignition switch is unlocked or removed from the mechanical or electromechanical ignition switch or is outside a defined zone around an electronic ignition switch of a motor vehicle, THEN—if this has not already taken place—the parking lock of the transmission is engaged") takes into account the driver's request, articulated by unlocking the ignition switch or removing the ignition key, to lock the drivetrain of the motor vehicle, and accordingly switches the transmission to the park position with a blocked output.

As a result, the combination of these six individual functions, by way of logical AND results in particularly high vehicle availability with, at the same time, sufficient appreciation of the obligatory safety aspects relating to the vehicle occupants and their surroundings.

Figure 2:
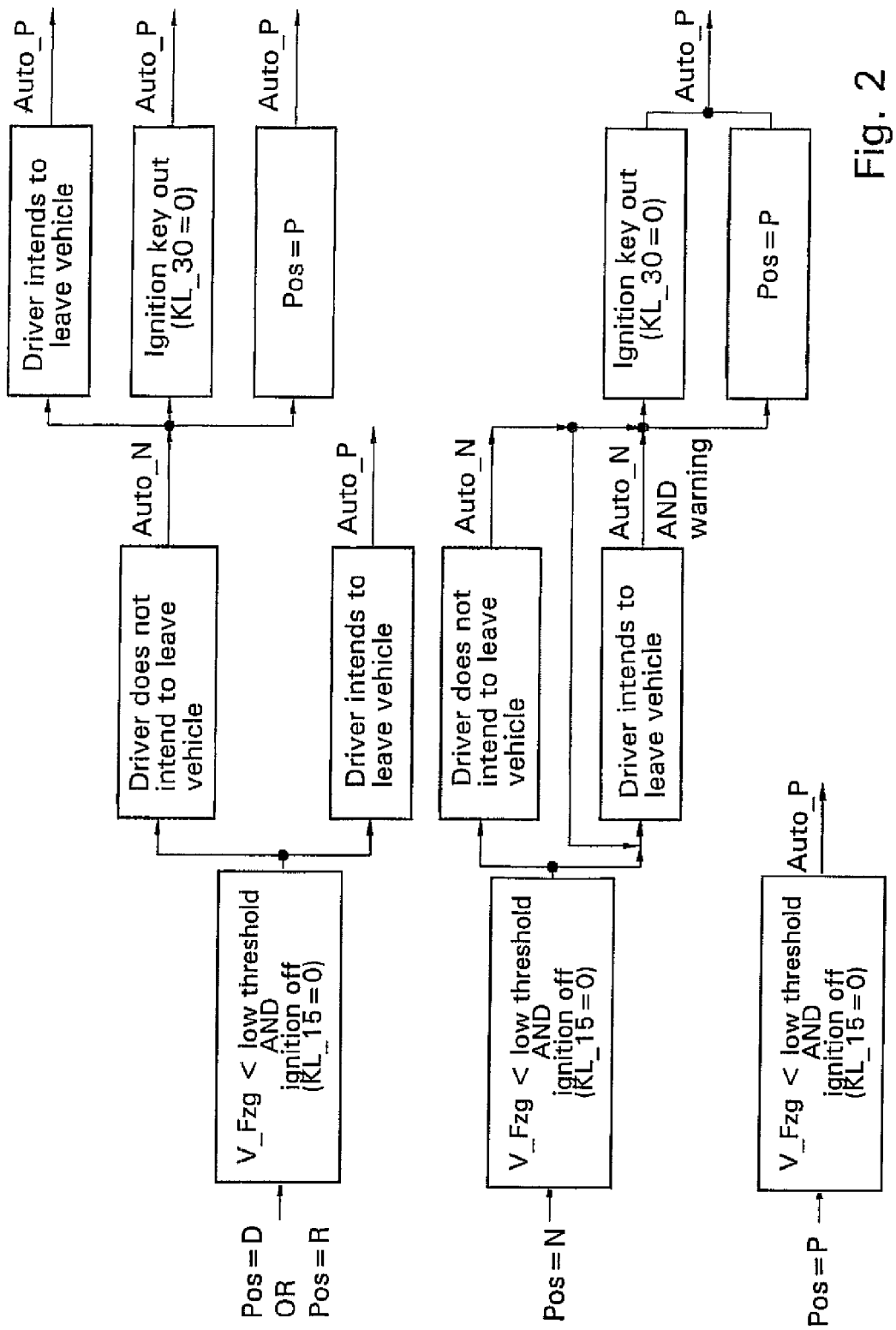
FIG. 2 is an operation sequence diagram of a second embodiment of the method of automatically engaging the parking lock of the automatic or automated transmission of a motor vehicle.

As further explanation, an operation sequence diagram is depicted in FIG. 2 as an example of the technical implementation of a method according to the above-detailed second approach in accordance with the invention. Because this graphic depiction is as such clearly understandable to the person skilled in the art, a comprehensive explanation of this figure can be dispensed with at this point, in order to avoid repetition. The reference symbols used and their meanings are given in the list of reference symbols.

In a third approach to the object, it is provided that in accordance with the invention that IF a detected current speed of the motor vehicle is lower than a predefined low threshold value, AND at the same time a ignition circuit acting on a drive motor of the motor vehicle is electrically closed, AND at the same time the drive motor is stopped, AND at the same time a drive position "Neutral" (N) is selected by way of the selector device, AND it is detected at the same time that the driver does not intend to leave the vehicle, the drive position "Neutral" (N) remains engaged in the transmission, AND that IF the current speed of the motor vehicle is lower than the predefined low threshold value, AND at the same time the ignition circuit is electrically interrupted, AND at the same time the drive motor is stopped, AND at the same time the drive position "Neutral" (N) is selected using the selector device, AND it is detected at the same time that the driver intends to leave the vehicle or is in the process of doing so, the drive position "Neutral" (N) remains engaged or is engaged in the transmission, AND a warning is automatically sent to the driver, AND that IF the current speed of the motor vehicle is lower than the predefined low threshold value, AND at the same time the ignition circuit is electrically closed, AND at the same time the drive motor is stopped, AND at the same time the drive position "Drive" (D) or "Reverse" (R) is selected using the selector device, the parking lock of the transmission is automatically engaged, AND that IF the current speed of the motor vehicle is lower than the predefined low threshold value, AND at the same time the ignition circuit is electrically closed, AND at the same time a drive position "Park" (P) is selected using the selector device, the parking lock of the transmission is engaged or remains engaged.

In accordance with the invention, therefore, here four individual functions, each with its own functional logic, are combined using Boolean AND-operators into a complex overall function.

The first individual function ("IF a detected current speed of the motor vehicle is lower than a predefined low threshold value, AND at the same time an ignition circuit acting on a drive motor of the motor vehicle is electrically closed, AND at the same time the drive motor is stopped, AND at the same time a drive position of "Neutral" is selected using the selector device, AND it is detected at the same time that the driver does not intend to leave the motor vehicle, THEN—if this has not already taken place—the drive position "Neutral" is engaged in the transmission") takes into account the driving states in which the driver, before or during detection that the motor vehicle, with a stopped drive motor but with a closed ignition circuit, is stopped or has almost come to a stop, has himself selected the neutral position using the selector device of the motor vehicle. In order to realize the greatest possible drivability of the motor vehicle—for example in order to use a car wash facility—automatic engagement of the parking lock of the transmission is dispensed with. There is a high safety level for the vehicle occupants and their surroundings because, on the one hand, the driver has himself deliberately selected the neutral position of the transmission and thus the disengagement of the drivetrain of the motor vehicle, and on the other hand, because it is also monitored whether the driver intends to leave the vehicle or is in the process of doing so. The driver can at any time actively engage the parking lock of the transmission himself, by shifting the selector device from "Neutral" to "Park." As an option, it can also be provided that in addition, by way of an ignition-switch lock that is activated in parallel with the selected drive position N, or generally in parallel with a selected drive position "NON P"—also known as a "key lock"—it is ensured that the mechanical ignition key is not unintentionally removed from its (mechanical or electromechanical) ignition switch or, with a keyless ignition-switch system, that the electronic ignition key—also known as a "ID card"—cannot be unintentionally moved too far from its (electronic) ignition switch. In the active state, known mechanical ignition-switch locks for example prevent, by way of an electromagnetically actuated locking element, the ignition key from being pulled out of the ignition switch if the selector device of the motor vehicle is not in the drive position "Park" (P).

However, if it is detected that the driver intends to leave the vehicle while the motor vehicle, with the drive motor stopped but with the ignition circuit closed and almost stopped, while the transmission, at the driver's request, is in the neutral position, the second individual function ("IF the current speed of the motor vehicle is lower than the predefined low threshold value, AND at the same time the ignition circuit is electrically closed, AND at the same time the drive motor is stopped, AND at the same time drive position "Neutral" (N) is selected using the selector device, AND it is detected at the same time that the driver intends to leave the vehicle or is in the process of doing so, THEN—if this has not already taken place—the drive position "Neutral" is engaged in the transmission, AND in addition a warning is automatically given to the driver") becomes active: the transmission remains in the neutral position desired by the drive; however, a relevant warning is now delivered automatically to the driver, notifying the driver of potential vehicle rolling. In order to prevent possible undesired rolling of the vehicle, the driver can himself actively engage the parking lock of the transmission at any time by shifting the selector device from "Neutral" to "Park." The option mentioned above in connection with the previously described first individual function, of additional activation of the ignition circuit lock whenever the drive position N, or "NON P" is selected or detected, can also be provided within the framework of the second individual function, as additional protection.

The third individual function ("IF the current speed of the motor vehicle is lower than the predefined low threshold value, AND at the same time the ignition circuit is electrically closed, AND at the same time the drive motor is stopped, AND at the same time the drive position "Drive" or "Reverse" has been selected using the selector device, THEN the parking lock of the transmission is automatically engaged") takes into account the operating states in which the selector device before or during detection that the motor vehicle, with stopped drive motor but closed ignition circuit, is stopped or has at least nearly come to a stop, is in a position which results in power being transmitted to the transmission due to the drive motor running, or because there is a sufficient supply of pressure medium to the transmission.

The fourth individual function ("IF the current speed of the motor vehicle is lower than the predefined low threshold value, AND at the same time the ignition circuit is electrically closed, AND at the same time, a drive position "Park" is selected using the selector device, THEN—it this has not already taken place—the parking lock of the transmission is engaged") takes into account the operating states in which the driver, before or during detection that the motor vehicle, with the drive motor stopped but with a closed ignition circuit, is stopped or has at least almost come to a stop, has himself selected the park position using the selector device. This unequivocal wish on the part of the driver is implemented in the transmission in connection with this fourth individual function.

As a result, by way of the combination of these four individual functions by way of logical AND, high vehicle availability is achieved, along with a high degree of safety for the vehicle occupants and surroundings.

Figure 3:
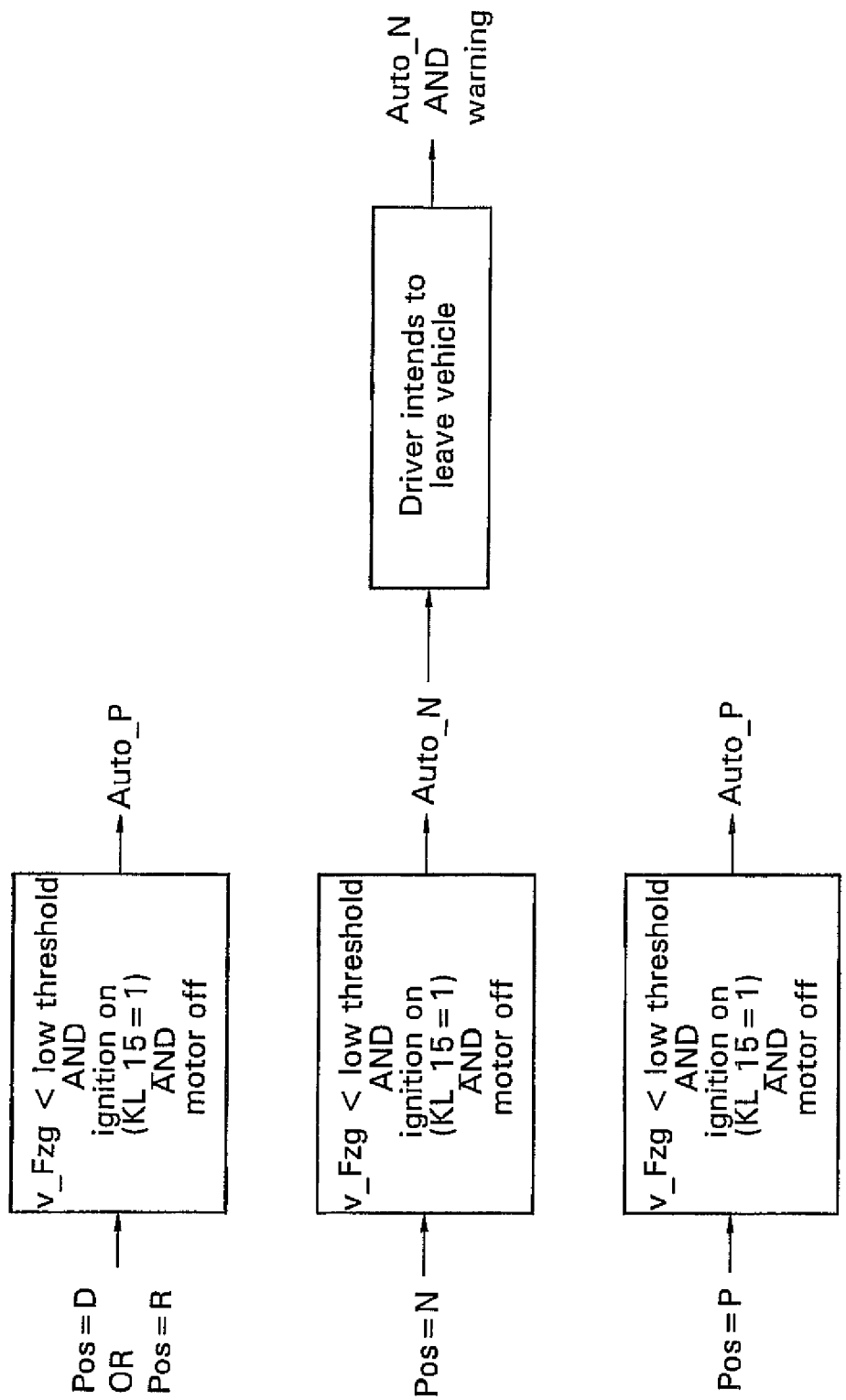
FIG. 3 is an operation sequence diagram of a third embodiment of the method of automatically engaging the parking lock of the automatic or automated transmission of a motor vehicle.

For further explanation, FIG. 3 presents an operation sequence diagram as an example of technical implementation of a method according to the above-detailed third approach according to the invention. Because this graphic presentation as such is clearly understandable for the person skilled in the art, extensive explanation of the figure can be dispensed with at this point, in order to avoid repetition. The reference symbols used and their significant are given in the list of reference symbols.

In a fourth approach to the object, it is provided in accordance with the invention that IF a detected current speed of the motor vehicle is lower than a predefined low threshold value, AND at the same time an ignition circuit of the motor vehicle that acts on the drive motor of the motor vehicle is electrically closed, AND at the same time the drive motor is stopped, AND at the same time the drive position "Neutral" (N) or "Drive" (D) or "Reverse" (R) is selected using the selector device, the drive position "Neutral" (N) remains engaged in the transmission, or is automatically engaged, AND that IF the current speed of the motor vehicle is lower than the predefined low threshold value, AND at the same time the ignition circuit is electrically closed, AND at the same time the drive motor is stopped, AND it is detected at the same time that the driver intends to leave the motor vehicle or is in the process of doing so, a warning is automatically given to the driver, AND that IF the current speed of the motor vehicle is lower than the predefined low threshold value, AND at the same time the ignition circuit is electrically closed, AND at the same time the drive motor is stopped, AND at the same time the drive position "Park" (P) is selected using the selector device, the parking lock of the transmission is engaged or remains engaged.

In accordance with the invention, therefore, three individual functions are here combined, each with its own functional logic, by way of Boolean AND-operators into a complex overall function.

The first individual function ("IF a detected current speed of the motor vehicle is lower than a predefined threshold value AND at the same time an ignition circuit of the motor vehicle that acts on the drive motor of the motor vehicle is electrically closed, AND at the same time the drive motor is stopped, AND at the same time, a drive position "Neutral" or "Drive" or "Reverse" is selected using the selector device, THEN—if this has not already taken place—the drive position "Neutral" will be engaged) takes into account the operating states in which the selector device, before or during detection that the motor vehicle, with the drive motor shut off but the ignition circuit closed, is stopped or has almost come to a stop, is in a position outside of the parking position. In order achieve the greatest possible vehicle availability, i.e., in order to achieve the least impairment of the mobility of the motor vehicle, automatic engagement of the parking lock is dispensed with in favor of automatic engagement of the non-engaged neutral position of the transmission. In order to increase safety, it can also optionally be provided that by way of an ignition-switch lock activated in parallel with the selected "NON P" drive position—also known as a "key lock"—it can be ensured that the mechanical ignition key cannot be unintentionally withdrawn from its (mechanical, or electromechanical) ignition switch, or that with a keyless ignition-switch system, the electronic ignition key—also known as a "ID card"—cannot be unintentionally moved too far from its (electronic) ignition switch. In activated state, known mechanical ignition-switch locks prevent, for example by way of an electromagnetically activated locking element, the ignition key from being withdrawn from the ignition switch if the selection device of the motor vehicle is not in the drive position "Park" (P).

The second individual function ("IF the current speed of the motor vehicle is lower than the predefined low threshold value, AND at the same time the ignition circuit is electrically closed, AND at the same time the drive motor is stopped, AND it is detected at the same time that the driver intends to leave the motor vehicle or is in the process of doing so, THEN a warning is delivered automatically to the driver") serves to increase safety in that the driver is actively notified that the drivetrain of the motor vehicle is not locked, that the motor vehicle could roll, and that he must take action in order to secure the motor vehicle against unintentional rolling, either by selecting the drive position "Park" by way of the selector device or by actuating a vehicle handbrake.

The third individual function ("IF the current speed of the motor vehicle is lower than the predefined low threshold value, AND at the same time the ignition circuit is electrically closed, AND at the same time the drive motor is stopped, AND at the same time the drive position "Park" is selected using the selector device, THEN—unless this has already taken place—the parking lock of the transmission is engaged") takes into account the operating states in which the driver, before or during detection that the motor vehicle, with the drive motor stopped but with a closed ignition circuit, is stopped or has at least almost come to a stop, has himself selected the parking position by way of the selector device. This unequivocal wish on the part of the driver is implemented in the transmission by way of this third individual function.

As a result, through the combination of these three individual functions by way of logical AND, the greatest possible vehicle availability is achieved while simultaneously sufficient attention is given to obligatory safety aspects.

Figure 4:
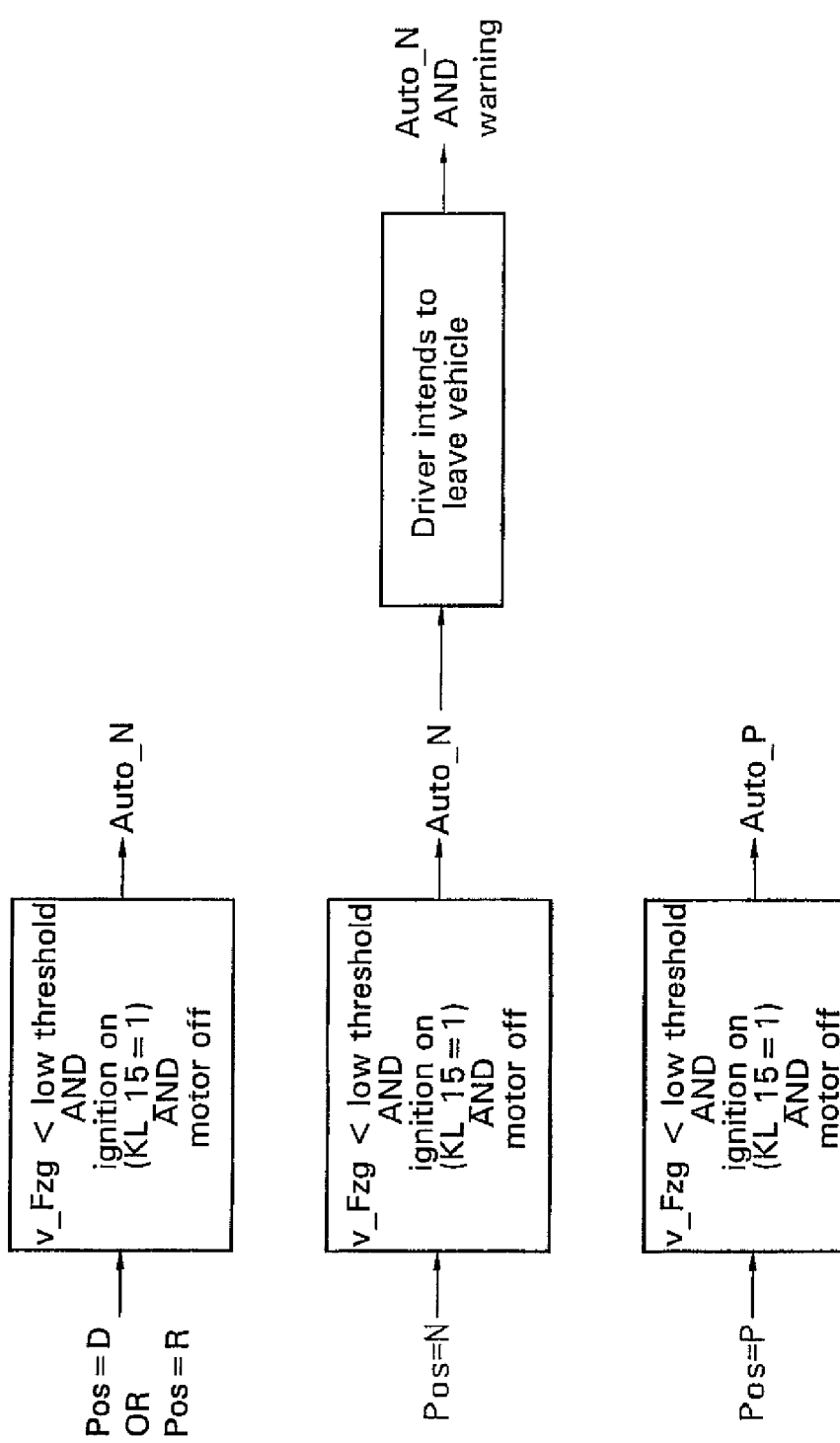
FIG. 4 is an operation sequence diagram of a fourth embodiment of the method of automatically engaging the parking lock of the automatic or automated transmission of a motor vehicle.

For further explanation, an operation sequence diagram is shown in FIG. 4 as an example of technical implementation of a method according to the above-detailed fourth approach according to the invention. As their graphic presentation is clearly understandable as such for the person skilled in the art, extensive explanation of the Figures can be dispensed with at this point, in order to avoid repetition. The reference symbols used and their significance are given in the list of reference symbols.

In a fifth approach to the object, it is provided in accordance with the invention that IF a detected current speed of the motor vehicle is lower than a predefined low threshold value, AND at the same time the drive motor is running, AND at the same time, a drive position "Neutral" (N) is selected using the selector device, AND it is detected at the same time that the driver does not intend to leave the vehicle, the drive position "Neutral" (N) remains engaged in the transmission or is engaged, AND that IF the current speed of the motor vehicle is lower than the predefined low threshold value, AND at the same time the drive motor is running, AND at the same time the drive position "Neutral" (N) is selected using the selector device, AND it is detected at the same time that the driver intends to leave the motor vehicle or is in the process of doing so, the drive position "Neutral" (N) remains engaged or is engaged, AND a warning is automatically given to the driver, AND that IF the current speed of the motor vehicle is lower than the predefined low threshold value, AND at the same time the drive motor is running, AND at the same time the drive position "Drive" (D) is selected using the selector device, AND it is detected at the same time that the driver does not intend to leave the motor vehicle, the drive position "Drive" (D) is engaged in the transmission or remains engaged, AND that IF the current speed of the motor vehicle is lower than the predefined low threshold value, AND at the same time the drive motor is running, AND at the same time a drive position "Reverse" (R) is selected using the selector device, AND it is detected at the same time that the driver does not intend to leave the vehicle, the drive position "Reverse" (R) is engaged or remains engaged, AND that IF the current speed of the motor vehicle is lower than the predefined low threshold value, AND at the same time the drive motor is running, AND at the same time the drive position "Drive" (D) or "Reverse" (R) is selected using the selector device, AND it is detected at the same time that the driver intends to leave the vehicle or is in the process of doing so, the parking brake is automatically engaged in the transmission, AND that IF the current speed of the motor vehicle is lower than the predefined low threshold value, AND at the same time the drive motor is running, AND at the same time a drive position "Park" (P) is been selected using the selector device, the parking lock of the transmission is engaged or remains engaged.

In accordance with the invention, six individual functions are combined here, each with its own functional logic, by way of Boolean AND-operators into a complex overall function.

The first individual function ("IF a detected current speed of the motor vehicle is lower than a predefined low threshold value, AND at the same time the drive motor is running, AND at the same time, a drive position "Neutral" is selected using the selector device, AND it is detected at the same time that the driver does not intend to leave the vehicle, THEN—if this has not already taken place—the drive position "Neutral" is engaged in the transmission") takes into account the operating states in which the driver, before or during recognition that the motor vehicle is stopped with the drive motor running or has at least almost come to a stop, has himself selected the neutral position by way of the selector device. In order to realize the highest possible vehicle availability of the motor vehicle—for example for use in a car wash facility—automatic engagement of the parking lock of the transmission is dispensed with. There is a high degree of safety for the vehicle occupants and the surroundings, on the one hand, because the driver has himself deliberately specified the neutral position of the transmission and thus the non-engagement of the drive chain of the motor vehicle, and on the other hand, because it is then additionally monitored whether the driver intends to leave the vehicle or is in the process of doing so. If it is definitely detected that the driver does not intend to leave the vehicle, no further actions are required. The driver himself can at any time actively engage the parking lock of the transmission by shifting the selector device from "Neutral" to "Park." As an option for a further increase in safety, it can also be provided that by way of an ignition-switch lock that is activated in parallel with the selected drive position N, or in general parallel to a selected drive position "NON P"—also known as a "key lock"—it can be ensured that the mechanical ignition key is not unintentionally removed from its (mechanical or electromechanical) ignition switch, or that in the case of a keyless ignition-switch system, the electronic ignition key—also known as a "ID card"—will not be unintentionally removed too far from its (electronic) ignition switch. In an actuated state, known mechanical ignition locks, for example by way of an electromagnetically actuated locking element, prevent the ignition key from being removed from the ignition switch if the selector device of the motor vehicle is not in the drive position "Park" (P).

If it is detected, however, that the driver intends to leave the motor vehicle while the motor vehicle, with the drive motor running, has at least almost come to a stop, and the transmission, at the driver's request, is in a neutral position, the second individual function ("IF the current speed of the motor vehicle is lower than the predefined low threshold value, AND at the same time the drive motor is running, AND at the same time the drive position "Neutral" is selected by way of the selector device, AND it is detected at the same time that the driver intends to leave the vehicle or is in the process of doing so, THEN—if this has not already taken place—the drive position "Neutral" is engaged in the transmission, AND in addition, a warning is automatically given to the driver") becomes active: the transmission remains in the neutral position desired by the driver, but in addition, a relevant warning is given automatically to the driver, which alerts the driver to potential rolling of the motor vehicle. In order to prevent potentially unwanted rolling of the vehicle, the driver himself can at any time actively engage the parking lock of the transmission by shifting the selector device from "Neutral" to "Park." The option mentioned above in connection with the previously described first individual function, of additional activation of the ignition circuit lock whenever the drive position N, or "NON P" is selected or detected, can also be provided within the framework of the second individual function, as additional protection.

The third individual function ("IF the current speed of the motor vehicle is lower than the predefined low threshold value, AND at the same time the drive motor is running, AND at the same time a drive position "Drive" is selected using the selector device, AND it is detected at the same time that the driver does not intend to leave the vehicle, THEN—if this has not already happened—the drive position "Drive" is engaged in the transmission) and the fourth individual function ("IF the current speed of the motor vehicle is lower than the predefined low threshold value, AND at the same time the drive motor is running, AND at the same time a drive position "Reverse" is selected using the selector device, AND at the same time, it is detected that the driver does not intend to leave the vehicle, THEN—if this has not already taken place—the drive position "Reverse" is engaged in the transmission") take into account the operating states in which the transmission of the motor vehicle, as desired by the driver, is in an engaged position when the motor vehicle is stopped or has almost come to a stop with the drive motor running. In order to heighten operating safety, additional monitoring is provided in connection with the fourth individual function, by way of which it is detected whether the driver of the motor vehicle intends to leave the motor vehicle during an operating state of this kind or is in the process of doing so. Automatic intervention is not necessary, at least as long as it securely detected that the driver does not intend to leave the vehicle. As in the case of the two previously described individual functions, additional protection can also be provided in connection with these third and fourth individual functions, such that whenever the drive position "NON P is selected or detected, the ignition-switch lock is also activated.

If, however, it is detected that the driver intends to leave the motor vehicle while the motor vehicle, with the drive motor running, is almost stopped, and the transmission, as the driver desires, is in an engaged drive position (D or R), the fifth individual function ("IF the current speed of the motor vehicle is lower than the predefined low threshold value, AND at the same time the drive motor is running, AND at the same time a drive position "Drive" or "Reverse" is selected using the selector device, AND at the same time it is detected that the driver intends to leave the vehicle or is in the process of doing so, THEN the parking lock of the transmission is automatically engaged") becomes active. But if the driver leaves the vehicle in this kind of operating state, inadvertent spontaneous rolling of the motor vehicle can be expected. In order to prevent this, in connection with the fifth individual function, monitoring of the driver becomes active and by way of automatic engagement of the parking lock, immediately puts the transmission in the safe park position when it is detected in this kind of operating state that the driver intends to leave the motor vehicle or is in the process of doing do.

The sixth individual function ("IF the current speed of the motor vehicle is lower than the predefined low threshold value, AND at the same time the drive motor is running, AND at the same time a drive position "Park" is selected using the selector device, THEN—if this has not already taken place—the parking lock of the transmission is engaged") takes into account the operating states in which the driver, before or during detection that the motor vehicle, with the drive motor running, is stopped or has at least almost come to a stop, has himself selected the park position using the selector device of the motor vehicle. This unequivocal wish on the part of the driver is implemented in connection with this sixth individual function.

As a result, through the combination of these six individual functions by way of logical AND, high vehicle availability is achieved simultaneously with a high degree of safety for the vehicle occupants and surroundings.

Figure 5:
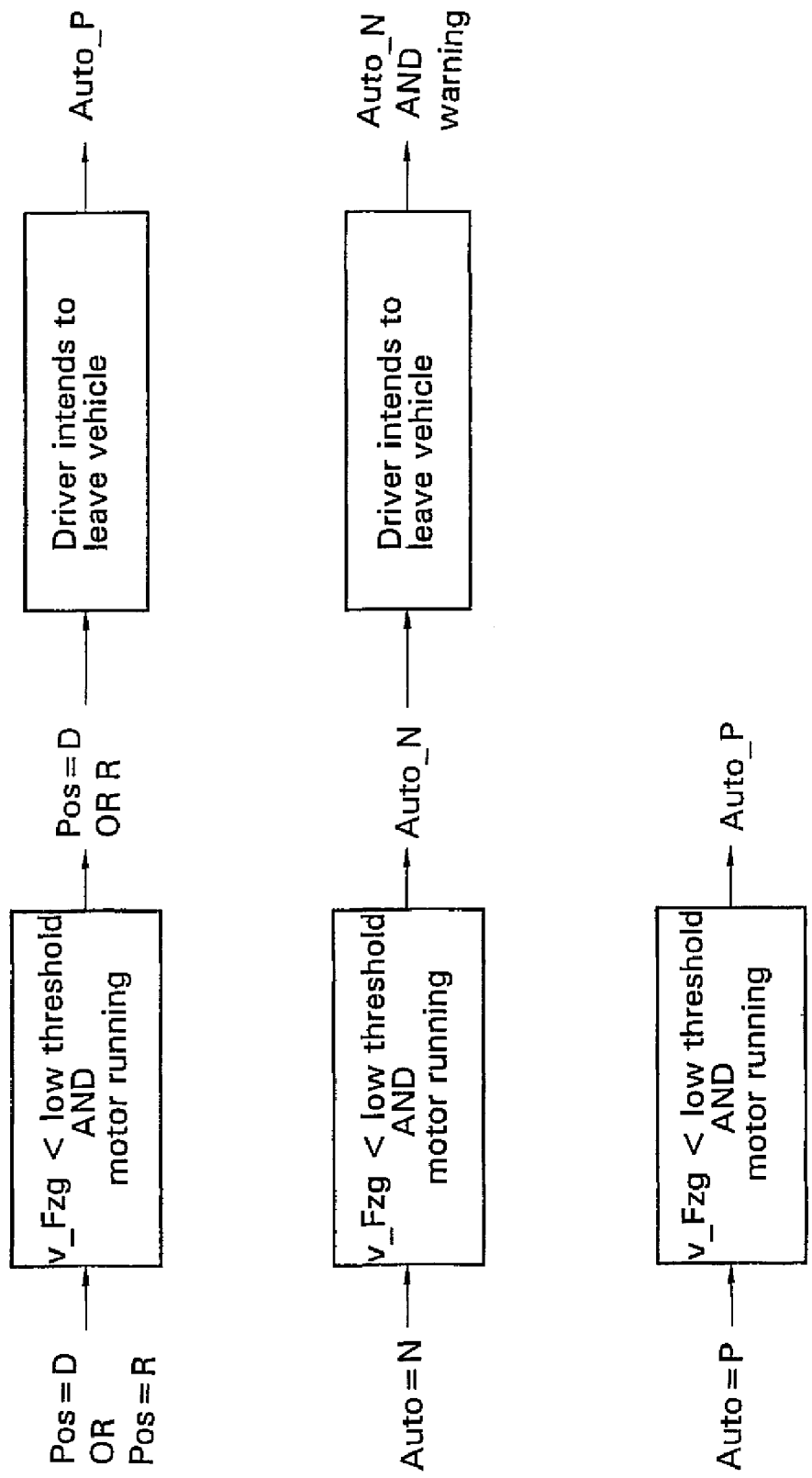
FIG. 5 is an operation sequence diagram of a fifth embodiment of the method of automatically engaging the parking lock of the automatic or automated transmission of a motor vehicle.

As further explanation, an operation sequence diagram is shown in FIG. 5 as an example of technical implementation of a method according to the above-detailed fifth approach according to the invention. Because this graphic depiction is as such clearly understandable to the person skilled in the art, a comprehensive explanation of this figure can be dispensed with at this point, in order to avoid repetition. The reference symbols used and their meanings are given in the list of reference symbols.

Additional embodiments and further developments of the invention are described in more detail below.

Thus an embodiment of the second, third, fourth, and fifth approach in accordance with the invention can provide for a warning to be issued acoustically and/or optically when it is detected that the driver wishes to leave the vehicle or is in the process of doing so.

In a further embodiment of the second, third, fourth, and fifth approach in accordance with the invention, several methods are proposed as to how to detect that the driver intends to leave the vehicle or is in the process of doing so.

For example, it can be provided that IF the driver door of the motor vehicle is open AND the driver's seatbelt is open, it is detected that the driver intends to leave the vehicle or is in the process of doing so.

Alternatively, it can for example be provided that IF the driver door of the motor vehicle is open AND a driver's seat occupancy detector reports an unoccupied driver's seat, it is detected that the driver intends to leave the vehicle or is in the process of doing so.

In another alternative, it can be provided, for example, that IF a driver's seat belt is not buckled AND a driver's seat occupancy detector reports an unoccupied driver's seat, it is detected that the driver intends to leave the vehicle or is in the process of doing so.

In a further alternative, it can be provided, for example, that IF the driver door of the motor vehicle is open AND a driver's seat belt is not buckled, AND a driver's seat occupancy detector reports an unoccupied driver's seat, it is detected that the driver intends to leave the vehicle or is in the process of doing so.

The following two further developments of the invention apply to the protection of the energy supply of the vehicle and can be combined with all previously described methods according to the first, second, third, fourth, and fifth approaches. Based on the consideration that it might be useful, in unfavorable cases, to prematurely end the condition of neutral position of the transmission, it is proposed in a first further development that the neutral position previously activated at the driver's request, regardless of the drive position "N" that was selected using the selector device, is automatically ended and the parking lock automatically engaged if a predetermined time interval has passed. In this case, the cited time interval reasonably would start when the position "N" of the selector device has been detected, or at the latest when the transmission is actually in a neutral position. This relatively simple functional enlargement of the method according to the invention prevents the vehicle battery from discharging too much because of the electric load, in particular that of the transmission control device.

Even more efficient protection against excessive battery discharge is offered by the second further development of the invention, which proposes that the current charge state and/or the current electric voltage of the vehicle battery be monitored. If the charge state or the electric voltage of the vehicle battery drops to a value below a predetermined discharge threshold, the previously activated neutral position of the transmission is automatically terminated, and the parking lock of the transmission is engaged regardless of the drive position that has been selected using the selector device. This monitoring of the charge state and/or voltage is, of course, not limited to monitoring of the vehicle battery, but also extends to all electric energy sources provided to supply the control device that controls the parking lock, particularly when this energy source also provides or must provide the necessary energy for restarting the drive motor.

The most efficient protection against excessive battery discharge is offered by the third further development of the invention, which proposes monitoring of the amount of energy consumed—particularly by the transmission control device—during the functioning of the vehicle battery in accordance with the invention, or of the electric energy source of the motor vehicle provided to supply the transmission control device and/or to start the drive motor. Such an amount of energy can be determined relatively easily by computation, for example by integrating the actual current power consumption over time, or by integrating the mathematical product of the actual current operating voltage and actual current power consumption of the transmission device over time. Accordingly, in the further development of the invention proposed here, the previously actuated neutral position of the transmission is automatically terminated, and regardless of the drive position selected by way of the selector device, the parking lock of the transmission is automatically engaged when the amount of energy used by the vehicle battery in accordance with the invention, or that drawn from the electric energy source provided to supply the transmission control device and/or for starting the drive motor, exceeds a predefined threshold value.

In principle, all of the above cited methods in accordance with the invention are suitable for automatically engaging a parking lock of any design. Normally, the parking lock of an automatically switching transmission or of a transmission with automated shifting is integrated into the transmission itself. Usually the mechanical, hydraulic, pneumatic, electric, hydro-mechanical, pneumo-mechanical, electromechanical, electrohydraulic, or electropneumatic parking lock actuator system in known transmissions is also integrated into the transmission or arranged immediately on the outside of it. In the case of an electromechanical, electrohydraulic, or electropneumatic actuation system for the parking lock, the actuator acting on the parking lock is normally controlled by a transmission control device. That being the case, it is reasonable that the automatic engagement of the parking lock also be initiated by the transmission control device according to one of the described methods in accordance with the invention. However, in principle the control command that leads to the engagement of the parking lock of the transmission could also be transmitted to the transmission by any other electronic control device of the motor vehicle, for example from a control device of the selector device accessible to the driver.

REFERENCE NUMERALS v_Fzg vehicle speed
KL_15 ignition-switch contact "Ignition on/off" of an ignition circuit
KL_30 ignition-switch contact "Ignition key in ignition switch/removed"
Pos a drive position selected on a selector device
P drive position "Park"
N drive position "Neutral"
R drive position "Reverse"
D drive position "Drive"
Auto_N functional step "Engaging and leaving the transmission in the neutral position"
Auto_P functional step "Engaging the parking lock and leaving the parking lock in the engaged state"
key lock ignition switch lock
ID-card electronic ignition key

The invention claimed is:

1. A method for automatically engaging a parking lock of one of an automatic and an automated transmission of a motor vehicle that is engaged depending on a drive position (P, R, N, D) selected by a driver of the motor vehicle by way of a selector device, and depending on other operating parameters of the motor vehicle, the method comprising the steps of:
one of retaining the selector device in a drive position of "Neutral" (N) and automatically engaging the selector device in the drive position of "Neutral" (N) in the transmission, IF simultaneously a detected current speed (v_Fzg) of the motor vehicle is lower than a predefined low threshold value, AND an ignition circuit of the motor vehicle that acts on a drive motor of the motor vehicle is electrically interrupted, AND the drive position "Neutral" (N) is selected by the selector device;
engaging the parking lock of the transmission IF simultaneously the current speed (v_Fzg) of the motor vehicle is lower than the predefined low threshold value, AND the ignition circuit is electrically interrupted, AND one of a drive position "Drive" (D) and a drive position "Reverse" (R) is selected with the selector device;
one of engaging the parking lock of the transmission and retaining engagement of the parking lock of the transmission IF simultaneously the current speed (v_Fzg) of the motor vehicle is lower than the predefined low threshold value, AND the ignition circuit is electrically interrupted, AND a drive position "Park" (P) is selected by the selector device, and
automatically engaging the parking lock of the transmission IF simultaneously the current speed (v_Fzg) of the motor vehicle is lower than the predefined low threshold value, AND an ignition key in one of a mechanical and an electro-mechanical ignition switch is one of removed and taken outside a defined zone around an electronic ignition switch of the motor vehicle.

2. The method according to claim 1, further comprising the step of activating an ignition-switch lock (key lock) IF the drive position selected with the selector device is one of "Neutral" (N), "Drive" (D) and "Reverse" (R), to prevent a mechanical ignition key from being removed from one of a mechanical and an electro-mechanical ignition switch, and an electronic ignition key (ID card) from being moved a sufficient distance from an electronic ignition switch.

3. The method according to claim 1, further comprising the step of automatically disengaging the transmission from the previously activated neutral position, irrespective of the drive position "Neutral" (N) selected by the driver with the selector device and automatically engaging the parking lock when a predefined time interval has expired.

4. The method according to claim 3, further comprising the step of initiating the predefined time interval when one of the drive position "Neutral" (N) is detected by the selector device and no later than a point at which the transmission is in a neutral position.

5. The method according to claim 1, further comprising the step of automatically disengaging the transmission from the previously activated neutral position, irrespective of the drive position "Neutral" (N) selected using the selector device, and automatically engaging the parking lock IF a current charge condition of an electric energy source, which supplies a control device that at least one of actuates the parking lock and starts the drive motor, drops to a value below a predefined discharge threshold.

6. The method according to claim 1, further comprising the step of automatically disengaging the transmission from the previously activated neutral position, irrespective of the drive position "Neutral" (N) selected using the selector device, and automatically engaging the parking lock IF a current electric voltage of an electric energy source, that at least one of actuates the control device and starts the drive motor, has dropped to a value below a predefined discharge threshold.

7. The method according to claim 1, further comprising the step of automatically disengaging the transmission from the previously activated neutral position, irrespective of the drive position "Neutral" (N) selected using the selector device, and automatically engaging the parking lock when an amount of energy from an energy source of the motor vehicle, that is intended to supply a control device of the transmission and to start the drive motor, has one of reached and exceeded a predefined threshold value.

8. The method according to claim 7, further comprising the step of detecting the amount of energy with one of a mathematical integration of an actual current power consumption of the control device over time and a mathematical integration of a product of an actual operating voltage and actual power consumption of the control device over time.

9. The method according to claim 1, further comprising the step of initiating engagement of the parking lock with a control device of the transmission.

10. The method according to claim 1, further comprising the step of initiating engagement of the parking lock with a control device of the selector device of the motor vehicle.

11. A method for automatically engaging a parking lock of one of an automatic and an automated transmission of a motor vehicle that is engaged depending on a drive position (P, R, N, D) selected by a driver of the motor vehicle by way of a selector device, and depending on other operating parameters of the motor vehicle, the method comprising the steps of:

one of retaining the selector device in a drive position of "Neutral" (N) and automatically engaging the selector device in the drive position of "Neutral" (N) in the transmission IF simultaneously a detected current speed (v_Fzg) of the motor vehicle is lower than a predefined low threshold value, AND an ignition circuit of the motor vehicle that acts on a drive motor of the motor vehicle is electrically interrupted, AND the drive position "Neutral" (N) is selected with the selector device, AND it is detected that the driver of the motor vehicle does not intend to leave the vehicle;

one of retaining engagement of the transmission in the drive "Neutral" (N) position and engaging the transmission in the drive "Neutral" (N) position and automatically sending the driver a warning signal IF simultaneously the current speed (v_Fzg) of the motor vehicle is lower than the predefined low threshold value, AND the ignition circuit is electrically interrupted, AND the drive position "Neutral" (N) is selected by way of the selector device, AND it is detected that the driver one of intends to leave the motor vehicle and is in the process of leaving the motor vehicle;

automatically engaging the transmission in the drive position "Neutral" (N) IF simultaneously the current speed (v_Fzg) of the motor vehicle is lower than the predefined low threshold value, AND the ignition circuit is electrically interrupted, AND one of a drive position "Drive" (D) and "Reverse" (R) is selected by way of the selector device, AND it is detected that the driver does not intend to leave the motor vehicle;

automatically engaging the parking lock in the transmission IF simultaneously the current speed (v_Fzg) of the motor vehicle is lower than the predefined low threshold value, AND the ignition circuit is electrically interrupted, AND one of the drive position "Drive" (D) and "Reverse" (R) is selected, AND it is detected at the same time that the driver one of intends to leave the motor vehicle and is in the process of leaving the motor vehicle;

one of retaining engagement of the parking lock in the transmission and engaging the parking lock in the transmission IF simultaneously the current speed (v_Fzg) of the motor vehicle is lower than the predefined low threshold value, AND the ignition circuit is electrically interrupted, AND a drive position "Park" (P) is selected with the selector device, and engaging the parking lock in the transmission IF simultaneously the current speed (v_Fzg) of the motor vehicle is lower than the predefined low threshold value, AND an ignition key in one of a mechanical and an electro-mechanical ignition switch is one of unlocked and removed from the one of the mechanical and electro-mechanical ignition switch, and is withdrawn from a defined zone around an electronic ignition switch of the motor vehicle.

12. The method according to claim 11, further comprising the step of providing the warning at least one of acoustically and optically.

13. The method according to claim 11, further comprising the step of determining that the driver intends one of leave the motor vehicle and is leaving the motor vehicle when at least one of a driver door of the motor vehicle is open, a driver's seatbelt is not fastened, and a driver's seat occupancy detector reports an unoccupied driver's seat.

14. A method for automatically engaging a parking lock of one of an automatic and an automated transmission of a motor vehicle that is engaged depending on a drive position (P, R, N, D) selected by a driver of the motor vehicle by way of a selector device, and depending on other operating parameters of the motor vehicle, the method comprising the steps of:

one of retaining the selector device in a drive position of "Neutral" (N) and automatically engaging the selector device in the drive position of "Neutral" (N) in the transmission IF simultaneously a detected current speed (v_Fzg) of the motor vehicle is lower than a predefined low threshold value, AND an ignition circuit acting on a drive motor of the motor vehicle is electrically closed, AND the drive motor is stopped, AND the drive position "Neutral" (N) is selected with the selector device, AND it is detected that the driver does not intend to leave the motor vehicle;

automatically warning the driver and one of retaining the selector device in a drive position of "Neutral" (N) and automatically engaging the selector device in the drive position of "Neutral" (N) in the transmission IF simultaneously the current speed (v_Fzg) of the motor vehicle is lower than the predefined low threshold value, AND the ignition circuit is electrically closed, AND the drive motor is stopped, AND at the same time the drive position "Neutral" (N) is selected using the selector device, AND it is detected that the driver one of intends to leave the vehicle and is in the process of leaving the vehicle;

automatically engaging the parking lock of the transmission If simultaneously the current speed (v_Fzg) of the motor vehicle is lower than the predefined low threshold value, AND the ignition circuit is electronically closed, AND the drive motor is stopped, AND one of a drive position of "Drive" (D) and "Reverse" (R) is selected with the selector device, and one of engaging a parking lock of the transmission and retaining engagement of the parking lock of the transmission IF simultaneously the current speed (v_Fzg) of the motor vehicle is lower than the predefined low threshold value, AND the ignition circuit is electrically closed, AND a drive position "Park" (P) is selected with the selector device.

15. A method for automatically engaging a parking lock of one of an automatic and an automated transmission of a motor vehicle that is engaged depending on a drive position (P, R, N, D) selected by a driver of the motor vehicle by way of a selector device, and depending on other operating parameters of the motor vehicle, the method comprising the steps of:

one of retaining the selector device in a drive position of "Neutral" (N) and automatically engaging the selector device in the drive position of "Neutral" (N) in the transmission, IF simultaneously a detected current speed (v_Fzg) of the motor vehicle is lower than a predefined low threshold value, AND an ignition circuit of the motor vehicle acting on a drive motor of the motor vehicle is electrically closed, AND the drive motor is stopped, AND one of a drive position of "Neutral" (N), "Drive" (D) and "Reverse" (R) is selected using the selector device;

automatically warning the driver IF simultaneously the current speed (v_Fzg) of the motor vehicle is lower than the predefined low threshold value, AND the ignition circuit is electrically closed, AND the drive motor is stopped, AND it is detected that the driver intends to one of leave the motor vehicle and is in the process of leaving the vehicle, and one of engaging a parking lock of the transmission and retaining engagement of the parking lock of the transmission IF simultaneously the current speed (v_Fzg) of the motor vehicle is lower than the predefined low threshold value, AND the ignition circuit is electrically closed, AND the drive motor is stopped, AND a drive position "Park" (P) is selected with the selector device.

16. A method for automatically engaging a parking lock of one of an automatic and an automated transmission of a motor vehicle that is engaged depending on a drive position (P, R, N, D) selected by a driver of the motor vehicle by way of a selector device, and depending on other operating parameters of the motor vehicle, the method comprising the steps of:

one of retaining the selector device in a drive position of "Neutral" (N) and automatically engaging the selector device in the drive position of "Neutral" (N) in the transmission, IF simultaneously a detected current speed (v_Fzg) of the motor vehicle is smaller than a predefined low threshold value, AND a drive motor is running, AND the drive position "Neutral" (N) is selected with the selector device, AND it is detected that the driver does not intend to leave the vehicle;

automatically warning the driver and one of retaining the selector device in the drive position of "Neutral" (N) and automatically engaging the selector device in the drive position of "Neutral" (N) in the transmission IF simultaneously the current speed (v_Fzg) of the motor vehicle is lower than the predefined low threshold value, AND the drive motor is running, AND the drive position "Neutral" (N) is selected with the selector device, AND it is detected that the driver intends to one of leave the vehicle and is in the process of leaving the vehicle;

one of a drive position "Drive" (D) is engaged in the transmission and the drive position "Drive" (D) remains engaged in the transmission IF simultaneously the current speed (v_Fzg) of the motor vehicle is lower than the predefined low threshold value, AND the drive motor is running, AND the drive position "Drive" (D) is selected with the selector device, AND it is detected that the driver does not intend to leave the motor vehicle;

one of a drive position "Reverse" (R) is engaged in the transmission and the drive position "Reverse" (R) remains engaged in the transmission IF simultaneously the current speed (v_Fzg) of the motor vehicle is lower than the predefined low threshold speed, AND the drive motor is running, AND the drive position "Reverse" (R) is selected with the selector device, AND it is detected that the driver does not intend to leave the vehicle;

automatically engaging a parking lock of the transmission IF simultaneously the current speed (v_Fzg) of the motor vehicle is lower than the predefined low threshold value, AND the drive motor is running, AND the drive position of one of "Drive" and "Reverse" (R) is selected with the selector device, AND it is detected that the driver intends to one of leave the vehicle and is in the process of leaving the vehicle, and one of engaging the parking lock of the transmission and retaining engagement of the parking lock of the transmission IF simultaneously the current speed (v_Fzg) of the motor vehicle is lower than the predefined low threshold value, AND the drive motor is running, AND a drive position "Park" (P) is selected with the selector device.

* * * * *